United States Patent [19]

Rolf et al.

[11] Patent Number: 5,284,511
[45] Date of Patent: Feb. 8, 1994

[54] CONDITIONING PROCESS FOR PHTHALOCYANINE PIGMENTS

[75] Inventors: Meinhard Rolf, Leverkusen, Fed. Rep. of Germany; Abdul Sattar, Mt. Pleasant, S.C.

[73] Assignees: Miles Inc., Pittsburgh, Pa.; Bayer Aktiengesellschaft, Leverkusen, Fed. Rep. of Germany

[21] Appl. No.: 50,686

[22] Filed: Apr. 12, 1993

[51] Int. Cl.$^5$ ............................................. C09B 47/04
[52] U.S. Cl. ........................... 106/410; 106/411; 106/412; 106/413; 540/14; 540/136; 540/137; 540/140; 540/141; 540/122; 540/142
[58] Field of Search ............... 106/410, 411, 412, 413; 540/14, 136, 137, 140, 141, 142, 122

[56] References Cited

U.S. PATENT DOCUMENTS

| | | | |
|---|---|---|---|
| 2,486,351 | 10/1949 | Wiswall, Jr. | 540/141 |
| 2,556,728 | 6/1951 | Graham | 540/141 |
| 2,857,400 | 10/1958 | Cooper | 540/141 |
| 4,104,276 | 8/1978 | Kranz et al. | 540/134 |
| 4,104,277 | 8/1978 | Langley | 540/141 |
| 4,158,572 | 6/1979 | Blackburn et al. | 106/412 |
| 4,257,951 | 3/1981 | Matrick | 540/141 |
| 5,175,282 | 12/1992 | Roth et al. | 540/141 |

FOREIGN PATENT DOCUMENTS

1502884  3/1978  United Kingdom .

*Primary Examiner*—Karl Group
*Assistant Examiner*—Scott L. Hertzog
*Attorney, Agent, or Firm*—Joseph C. Gil; Richard E. L. Henderson

[57] ABSTRACT

The present invention relates to a process for preparing a beta-phase metal phthalocyanine pigments in which
(a) a crude metal phthalocyanine having an average particle size of about 10 to about 200 μM is dry milled until the average particle size is reduced to about 0.01 to about 0.5 μm;
(b) the milled metal phthalocyanine is finished by thoroughly mixing said metal phthalocyanine with at least about 4 parts by weight, relative to the metal phthalocyanine, of a finishing solvent containing a mixture of
  (i) about 5 to 100 percent by weight, based on the total amount of finishing solvent, of a monocarboxylic acid monoester, dicarboxylic acid diester, diol diester, lactone, or cyclic carbonate, or a mixture thereof, and
  (ii) 0 to about 95 percent by weight, based on the total amount of finishing solvent, of water;
(c) the ester used in step (b) is hydrolyzed; and
(d) the beta-phase metal phthalocyanine pigment is collected.

16 Claims, No Drawings

CONDITIONING PROCESS FOR PHTHALOCYANINE PIGMENTS

BACKGROUND OF THE INVENTION

This invention relates to a process for the preparation of easily dispersible pigments of the beta-phase modification of metal phthalocyanine pigments, especially that of copper phthalocyanines. This process provides a simple and cost-effective method for manufacturing soft green-shade blue pigments having high color strength.

Crude copper phthalocyanine is usually prepared by a reaction of phthalic anhydride or a derivative thereof, urea, and a copper source, or by a reaction of phthalonitrile or a derivative thereof and a copper source in an organic solvent, optionally in the presence of ammonium or titanium salts (such as titanium tetrachloride). The resultant phthalocyanine particles, however, undergo crystal growth during preparation and have a major axis of about 10 to about 200 μm. Such copper phthalocyanines have little or no color value as a pigment for use in inks, coating compositions, plastics, and the like. For this reason, the crude copper phthalocyanine must be milled to obtain a high color value. Pigment milled in this way has a particle size of about 0.01 to about 0.5 μm and is a mixture of alpha and beta phases. The milled pigment is then recrystallized (or "finished") in a mixture of water and an organic solvent to provide optimum color properties of the beta-phase green-shade blue pigment.

Several methods have been described for preparing pigments having improved color value but these methods typically produce mixtures of alpha- and beta-crystal forms or require the use of special additives or solvent mixtures.

For example, British Patent 1,502,884 discloses a one-step process for preparing dispersible pigments of the beta-modification of copper phthalocyanine in which a coarser form of highly purified beta-phase copper phthalocyanine is ground in an organic liquid (optionally containing water) in the presence of certain phthalocyanine derivatives that improve dispersibility of the pigment.

U.S. Pat. No. 4,104,276 discloses the use of certain copper phthalocyanine derivatives as additives to inhibit "overcrystallization" when milled phthalocyanine pigments are recrystallized in organic or aqueous organic solvents.

U.S. Pat. No. 4,104,277 discloses a process for preparing an alpha-phase or beta-phase copper phthalocyanine 10, pigment. A crude copper phthalocyanine is first dry milled (which increases the alpha phase relative to the beta phase) and then mixed with an emulsion containing an amine, water, and a surfactant.

U.S. Pat. No. 4,158,572 discloses a method of making a pure beta-phase phthalocyanine pigment. An initial dry milling operation produces a mixture of alpha- and beta-crystal forms. The mixture is then conditioned by stirring in an aqueous medium containing a surfactant to obtain the required pigment particle size and to convert the remaining alpha-phase phthalocyanine to the beta phase.

U.S. Pat. No. 4,257,951 discloses a two-step milling process for preparing beta-phase copper phthalocyanine pigment. In the first stage, a crude copper phthalocyanine is dry milled in the presence of a hydrated aluminum sulfate and an organic solvent. In the second stage, the milled product is treated with an emulsion of an organic liquid in water, optionally in the presence of a surfactant.

U.S. Pat. No. 5,175,282 also discloses a process for preparing beta-phase copper phthalocyanine pigment. Crude phthalocyanine is ball milled in the presence of organic solvents at 100° to 120° C. and then recrystallized at 90° to 140° C. in water mixed with 1 to 10% of an organic solvent.

The object of the present invention is to provide an improved process for preparing beta-phase metal phthalocyanine pigments having excellent dispersibility, tinting strength, clearness, gloss, and stability in coating compositions, printing inks, plastics, and the like. The present invention does not use special additives but nevertheless provides an economical route to products that are substantially 100% beta-phase pigments and that, in comparison with beta-phase copper phthalocyanines prepared by known methods, exhibit at least comparable dispersibility, brilliancy, and heat stability in plastics, inks, and paints.

SUMMARY OF THE INVENTION

The present invention relates to a process for preparing beta-phase metal (preferably copper) phthalocyanine pigments comprising
(a) dry milling a crude metal phthalocyanine (preferably copper phthalocyanine) having an average particle size of about 10 to about 200 μm (preferably at a temperature between about 10° C. and about 80° C. for about 4 to about 48 hours) until the average particle size is reduced to about 0.01 to about 0.5 μm;
(b) finishing the milled metal phthalocyanine by thoroughly mixing said metal phthalocyanine (preferably at a temperature of about 70° C. to about 90° C. for about 8 to about 12 hours) with at least about 4 parts by weight (preferably 4 to 5 parts by weight), relative to the metal phthalocyanine, of a finishing solvent comprising a mixture of
(i) about 5 to 100 percent by weight (preferably 5 to 40 percent by weight), based on the total amount of finishing solvent, of an ester selected from the group consisting of
(1) a monocarboxylic acid monoester having the formula

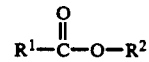

wherein
$R^1$ is $C_1-C_{23}$ (preferably $C_1-C_8$) alkyl, $C_2-C_{23}$ (preferably $C_2-C_8$) alkenyl, $C_4-C_8$ cycloalkyl optionally substituted with $C_1-C_8$ alkyl or $C_2-C_8$ alkenyl, $C_4-C_8$ cycloalkenyl optionally substituted with $C_1-C_8$ alkyl or $C_2-C_8$ alkenyl, or a group represented by $R^a-R^b$- wherein $R^a$ is $C_4-C_8$ cycloalkyl optionally substituted with $C_1-C_8$ alkyl or $C_2-C_8$ alkenyl or $C_4-C_8$ cycloalkenyl optionally substituted with $C_1-C_8$ alkyl or $C_2-C_8$ alkenyl and $R^b$ is $C_1-C_8$ alkylene or $C_2-C_8$ alkenylene, and
$R^2$ is $C_3-C_8$alkyl;
(2) adicarboxylic acid diester having the formula

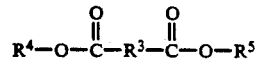

wherein
R³ is a direct single bond, $C_1$-$C_{22}$ (preferably $C_1$-$C_8$) alkylene, $C_2$-$C_{22}$ (preferably $C_2$-$C_8$) alkenylene, $C_4$-$C_8$ cycloalkylene optionally substituted with $C_1$-$C_8$ alkyl or $C_2$-$C_8$ alkenyl, $C_4$-$C_8$ cycloalkenylene optionally substituted with $C_1$-$C_8$ alkyl or $C_2$-$C_8$ alkenyl, or a group represented by —$R^c$—$R^d$—$R^e$—wherein $R^c$ and $R^e$ are independently $C_1$-$C_8$ alkylene or $C_2$-$C_8$ alkenylene and $R^d$ is $C_4$-$C_8$ cycloalkylene optionally substituted with $C_1$-$C_8$ alkyl or $C_2$-$C_8$ alkenyl or $C_4$-$C_8$ cycloalkenylene optionally substituted with $C_1$-$C_8$ alkyl or $C_2$-$C_8$ alkenyl, and
R⁴ and R⁵ are independently $C_1$-$C_8$ alkyl;
(3) a diol diester having the formula

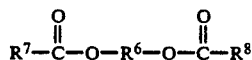

wherein
R⁶ is $C_2$-$C_{22}$ (preferably $C_2$-$C_8$) alkylene, $C_2$-$C_{22}$ (preferably $C_2$-$C_8$) alknylene, $C_4$-$C_8$ cycloalkylene optionally substituted with $C_1$-$C_8$ alkyl or $C_2$-$C_8$ alkenyl, $C_4$-$C_8$ cycloalkenylene optionally substituted with $C_2$-$C_8$ alkyl or $C_4$-$C_8$ alkenyl, or a group represented by —$R^f$—$R^g$—$R^h$— wherein $R^f$ and $R^h$ are independently $C_1$-$C_8$ alkylene or $C_2$-$C_8$ alkenylene and $R^g$ is $C_4$-$C_8$ cycloalkylene optionally substituted with $C_1$-$C_8$ alkyl or $C_2$-$C_8$ alkenyl or $C_4$-$C_8$ cycloalkenylene optionally substituted with $C_1$-$C_8$ alkyl or $C_2$-$C_8$ alkenyl, and
R⁷ and R⁸ are independently $C_1$-$C_8$ alkyl;
(4) a lactone or cyclic carbonate having the formula

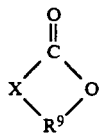

wherein
R⁹ is $C_2$-$C_6$ alkylene optionally substituted with $C_1$-$C_8$ alkyl or $C_2$-$C_8$ alkenyl or $C_2$-$C_6$ alkenylene optionally substituted with
$C_1$-$C_8$ alkyl or $C_2$-$C_8$ alkenyl, and
X is 0 or a direct single bond; and
(5) mixtures thereof; and
(ii) 0 to about 95 percent by weight (preferably 60 to 95 percent by weight), based on the total amount of finishing solvent, of water;
(c) hydrolyzing the ester used in step (b); and
(d) collecting the beta-phase metal phthalocyanine pigment.

DETAILED DESCRIPTION OF THE INVENTION

Although the present invention relates generally to metal phthalocyanine pigments, the most preferred metal phthalocyanine pigments are copper phthalocyanines. However, other metal-containing phthalocyanine pigments, such as those based on cobalt, iron, nickel, and other such metals, may also be used. Furthermore, the preferred phthalocyanine blue pigments of the present invention can be partially substituted (for example, with chlorine, alkyl, or other substituents typical of phthalocyanine pigments) or unsubstituted.

The pigments prepared according to the present invention are formed as substantially 100% beta-phase metal phthalocyanines. The term "beta-phase" (also known as the "beta-crystal form" or the "beta-modification") refers to one of the crystalline forms in which the metal phthalocyanines can exist. For example, the two major crystal forms for copper phthalocyanines having commercial importance are the alpha crystal form, which has a reddish blue color, and the beta crystal form, which has a greenish blue color. The X-ray diffraction spectra of these two forms are readily distinguishable.

In the process of the present invention, a crude phthalocyanine pigment having a particle size of about 10 to about 200 µm is milled to produce a mixture of alpha- and beta-phase material having a particle size of about 0.01 to about 0.5 µm. The milled pigment is then conditioned to the required pigmentary size and form by thoroughly mixing (e.g., by stirring) with aliphatic esters or mixtures of aliphatic esters and water. After the residual ester is hydrolyzed, the resultant beta-phase pigment is collected.

The dry milling step (a) can be carried out using procedures known in the art, such as ball milling in the absence of added water or other solvents or additives. To avoid undesirable crystal growth that can produce particles outside the desired size range of about 0.01 to about 0.5 µm, milling is preferably carried out at temperatures below about 80° C. (more preferably 40° to 50° C.). Milling must be carried out for a sufficient length of time to allow the particles to reach the desired size range (as determined, for example, by X-ray analysis), but the length of time is not otherwise critical. In general, a period of from about four hours up to about two days (preferably one to two days) is sufficient.

The finishing (or recrystallization) step (b) is carried out using certain non-aromatic esters or mixtures thereof with water as the finishing solvent. During the finishing process, the metal phthalocyanine particles undergo moderate crystal growth and conversion of any alpha-phase pigment to the desired beta-phase, thereby producing a soft pigment having high color strength.

Suitable finishing solvents include alkyl esters of (cyclo)aliphatic mono- or dicarboxylic acids, dialkanoyl esters of alkanediols, lactones, cyclic carbonates, and cyclic diesters, as well as mixtures thereof, optionally in the presence of water.

When used herein to describe the various finishing solvents, the term "$C_1$-$C_{23}$ alkyl" refers to straight or branched chain aliphatic hydrocarbon groups having from 1 to 23 carbon atoms. Examples of $C_1$-$C_{23}$ alkyl are methyl, ethyl, propyl, butyl, pentyl, hexyl, heptyl, octyl, nonyl, decyl, undecyl, dodecyl, myristyl, stearyl, and the isomeric forms thereof. The term "$C_2$-$C_{23}$ alkenyl" refers to the corresponding straight or branched chain aliphatic hydrocarbon groups having from 2 to 23 carbon atoms and one or more carbon-carbon double bonds (thus also encompassing, for example, dienes and trienes). The terms "$C_1$-$C_8$ alkyl", "$C_2$-$C_8$ alkenyl", and the like refer, of course, to the shorter chain members.

The term "$C_4$-$C_8$ cycloalkyl" refers to cycloaliphatic hydrocarbon groups having from 4 to 8 ring carbon atoms. Examples of $C_4$-$C_8$ cycloalkyl are cyclobutyl, cyclopentyl, cyclohexyl, cycloheptyl, and cyclooctyl.

The term "C$_4$-C$_8$ cycloalkenyl" refers to corresponding cycloaliphatic hydrocarbon groups having from 4 to 8 ring carbon atoms and one or more carbon-carbon double bonds (thus also encompassing C$_5$-C$_8$ cycloalkadienyl and C$_7$-C$_8$ cycloalkatrienyl but not phenyl).

The term "C$_1$-C$_{22}$ alkylene" refers to straight or branched chain aliphatic hydrocarbon groups attached to two other groups and having from 1 to 22 carbon atoms. As used herein, the term alkylene is used to encompass alkylidene groups in which both points of attachment are on the same carbon atom. Examples of C$_1$-C$_{22}$ alkylene are methylene (or methylidene), ethylene, propylene, butylene, pentylene, hexylene, heptylene, and the like, including the branched alkylene and alkylidene isomers thereof. The term "C$_2$-C$_{22}$ alkenylene" refers to the corresponding straight or branched chain aliphatic hydrocarbon groups having from 2 to 22 carbon atoms and one or more carbon-carbon double bonds (thus also encompassing, for example, dienes and trienes). The terms "C$_1$-C$_8$ alkylene, "C$_2$-C$_6$ alkylene, "C$_2$-C$_8$ alkenylene, "C$_2$-C$_6$ alkenylene", and the like refer, of course, to the shorter alkylene and alkenylene members.

The term "C$_4$-C$_8$cycloalkylene" refers to cycloaliphatic hydrocarbon groups attached to two other groups and having from 4 to 8 ring carbon atoms. As used herein, the term cycloalkylene is used to encompass cycloalkylidene groups in which both points of attachment are on the same ring carbon atom. Examples of C$_4$-C$_8$ cycloalkylene are cyclobutylene, cyclopentylene, cyclohexylene, cycloheptylene, and cyclooctylene, as well as the cycloalkylidene isomers thereof. The term "C$_4$-C$_8$ cycloalkenylene" refers to corresponding cycloaliphatic hydrocarbon groups attached to two other groups having from 4 to 8 ring carbon atoms and one or more carboncarbon double bonds (thus also encompassing C$_5$-C$_8$ cycloalkadienylene and C$_7$-C$_8$ cycloalkatrienylene but not phenylene).

Suitable monocarboxylic acid monoesters (1) include alkyl and alkenyl esters of monocarboxylic acids containing linear or branched alkyl and alkenyl groups and cycloalkyl and cycloalkenyl groups. Suitable monocarboxylic acids include alkanoic acids, such as acetic, propanoic, butanoic, pentanoic, hexanoic, lauric, myristic, and stearic acids, as well as corresponding alkenoic acids (such as oleic, linoleic, and linolenic acids), and the isomeric forms thereof. Suitable monocarboxylic acids also include cycloalkane monocarboxylic acids, such as cyclobutane, cyclopentane, cyclohexane, cycloheptane, and cyclooctane monocarboxylic acids, as well as corresponding cycloalkene carboxylic acids (such as cyclopentene or cyclohexene monocarboxylic acids). Each cycloalkyl or cycloalkenyl group can optionally be substituted at ring carbon atoms with alkyl or alkenyl groups, with preferred such compounds having one or two substituents on carbon atoms other than the ring carbon atom attached to the carboxyl group. Preferred monocarboxylic acid monoesters are those in which $R^1$ is C$_1$-C$_8$ alkyl, C$_4$-C$_8$ cycloalkyl optionally substituted with C$_1$-C$_8$ alkyl, or a $R^1$-$R^b$-group wherein $R^a$ is C$_4$-C$_8$ cycloalkyl optionally substituted with C$_1$-C$_8$ alkyl and $R^b$ is C$_1$-C$_8$ alkylene, and $R^2$ is C$_4$-C$_8$ alkyl. A suitable monocarboxylic acid monoester is butyl acetate.

Suitable dicarboxylic acid diesters (2) include alkyl and alkenyl diesters of dicarboxylic acids containing linear or branched alkylene, alkylidene, alkenylene, and alkenylidene groups and cycloalkylene and cycloalkenylene groups, as well as oxalic acid (which contains no hydrocarbon group between the two carboxyl functions and corresponds to compounds in which $R^3$ is a direct single bond). Suitable dicarboxylic acids include alkanedioic acids, such as malonic, succinic, glutaric, adipic, pimelic, suberic, azelaic, and sebacic acids, as well as corresponding alkenedioic acids (such as maleic and fumaric acids), and the isomeric forms thereof. Suitable dicarboxylic acids also include cycloalkane dicarboxylic acids, such as cyclobutane, cyclopentane, cyclohexane, cycloheptane, and cyclooctane dicarboxylic acids, as well as corresponding cycloalkene carboxylic acids (such as cyclopentene or cyclohexene dicarboxylic acids), and the isomeric forms thereof. Each cycloalkylene or cycloalkenylene group can optionally be substituted at ring carbon atoms with alkyl or alkenyl groups, with preferred such compounds having one or two substituents on carbon atoms other than the ring carbon atoms attached to the carboxyl groups. Suitable dicarboxylic acids also include compounds in which an alkylene or alkenylene chain is interrupted by a cycloalkane or cycloalkene ring, such as cyclohexanediacetic acid.

Esters of the dicarboxylic acids can have two different O-alkyl groups, although esters having identical alkyl groups are preferred.

Preferred dicarboxylic acid diesters (2) include di(C$_1$-C$_8$ alkyl) esters of oxalic acid, of C$_3$-C$_{10}$ alkanedioic acids (that is, diesters in which R$_3$ is C$_1$-C$_8$ alkylene), and of C$_4$-C$_{10}$ alkenedioic acids (that is, diesters in which R$_3$ is C$_2$-C$_8$alkenylene). Such diesters are the most preferred finishing solvents of the invention. Especially preferred dicarboxylic acid diesters (2) are dimethyl succinate, diethyl succinate, dimethyl adipate, dimethyl maleate, and dimethyl malonate.

Suitable diol diesters (3) include alkanoyl diesters of diols containing linear or branched alkylene, alkylidene, alkenylene, and alkenylidene groups and cycloalkylene and cycloalkenylene groups. Suitable diols include alkanediols, such as 1,2-ethanediol, 1,2- and 1,3-propanediol, 1,2-, 1,3-, 1,4-, and 2,3-butanediol, 1,5-pentanediol, 1,6-hexanediol, 1,7-heptanediol, 1,8-octanediol, and the like, as well as corresponding alkenediols, and the isomeric forms thereof. Suitable diols also include cycloalkane diols, such as 1,2- and 1,3-cyclobutanediol, 1,2- and 1,3-cyclopentanediol, 1,2-, 1,3-, and 1,4-cyclohexanediol, 1,2-, 1,3-, and 1,4-cycloheptanediol, and 1,2-, 1,3-, 1,4-, and 1,5-cyclooctanediol, as well as corresponding cycloalkene diols, and the isomeric forms thereof. Each cycloalkylene or cycloalkenylene group can optionally be substituted at ring carbon atoms with alkyl or alkenyl groups, with preferred such compounds having one or two substituents on carbon atoms other than the ring carbon atoms attached to the hydroxyl groups. Suitable diols also include compounds in which an alkylene or alkenylene chain is interrupted by a cycloalkane or cycloalkene ring, such as cyclohexanedimethanol. A suitable diol diester is 1,3-butanediol diacetate.

Suitable lactones (4) include cyclic esters of hydroxy-substituted carboxylic acids containing linear or branched alkylene or alkenylene groups, such as butyrolactone, valerolactone, caprolactone, and the like, as well as corresponding alkenylene analogs. Suitable cyclic carbonates (4) include carbonates of alkanediols or alkenediols in which both diol hydroxyl groups are esterified with the same carbonyl function, such as ethylene carbonate, propylene carbonate, and the like, as well as corresponding alkenylene analogs. The lactone and cyclic carbonate ring carbon atoms can optionally be substituted with alkyl or alkenyl groups.

Mixtures of any of the above-mentioned solvents are also suitable.

Although the exact amount of solvent used during the finishing process is not critical, it has been found that stirrable slurries are not obtained with less than about 4 parts by weight of finishing solvent for each part by weight of metal phthalocyanine. It has generally been found particularly advantageous to use about 4 to about 5 parts by weight of the finishing solvent. Larger quantities of solvent, although effective, are unnecessary and may even be undesirable for economic and environmental reasons. Although it is not necessary to include water during the finishing process, the addition of water allows the use of less ester, thereby providing further economic and environmental advantages. Mixtures of esters with up to about 95 percent by weight of water are suitable, with 60 to 95 percent by weight of water being particularly advantageous. Higher relative amounts of water, although operable, are less suitable for crystal growth.

Finishing can be carried out at temperatures in the range of, for example, from about 30° C. to about 145° C. In general, however, temperatures below about 70° C. are less preferred because of a tendency to give less readily dispersed pigment, and temperatures above about 90° C. are less preferred because of a tendency to give "overcrystallized" particles having weaker color. Finishing must be carried out for a sufficient length of time to allow the particles to attain optimum pigmentary values, but the length of time is not otherwise critical. In general, a period of at least eight hours is sufficient.

Although it is possible in theory to remove the ester solvent by physical separation methods, it has been found difficult in practice to remove all (or essentially all) of the solvent by purely physical means. Therefore, it has been found particularly advantageous to hydrolyze the esters before collecting the pigment. Hydrolysis step (c) can be carried out, for example, by heating the solvent-containing finished pigment with a strongly alkaline solution (preferably an aqueous solution), such as aqueous sodium or potassium hydroxide. A particularly preferred hydrolysis method involves heating the solvent-containing pigment in 50% aqueous sodium hydroxide at about 85° C. for about two hours. Other hydrolysis methods known in the art would, of course also be suitable. The carboxylate and alcohol by-products formed during hydrolysis can then be removed, for example, during the separation step.

The beta-phase pigment is collected in step (d) by methods known in the art, preferably filtration. When the pigment is collected by filtration, the hydrolysis by-products are easily removed when the pigment filter cake is washed (preferably with water). Other collection methods known in the art are suitable but are generally less preferred.

Because of their light stability and migration properties, the beta-phase phthalocyanine pigments prepared according to the present invention are suitable for many different pigment applications. For example, pigments prepared according to the invention can be used as the colorant (or as one of two or more colorants) for very lightfast pigmented systems. Examples include pigmented mixtures with other materials, pigment formulations, paints, printing ink, colored paper, or colored macromolecular materials. The term "mixtures with other materials" is understood to include, for example, mixtures with inorganic white pigments, such as titanium dioxide (rutile) or cement, or other inorganic pigments. Examples of pigment formulations include flushed pastes with organic liquids or pastes and dispersions with water, dispersants, and, if appropriate, preservatives. Examples of paints in which pigments of this invention can be used include, for example, physically or oxidatively drying lacquers, stoving enamels, reactive paints, two-component paints, solvent- or water-based paints, emulsion paints for weatherproof coatings, and distempers. Printing inks include those known for use in paper, textile, and tinplate printing. Suitable macromolecular substances include those of a natural origin, such as rubber; those obtained by chemical modification, such as acetyl cellulose, cellulose butyrate, or viscose; or those produced synthetically, such as polymers, polyaddition products, and polycondensates. Examples of synthetically produced macromolecular substances include plastic materials, such as polyvinyl chloride, polyvinyl acetate, and polyvinyl propionate; polyolefins, such as polyethylene and polypropylene; high molecular weight polyamides; polymers and copolymers of acrylates, methacrylates, acrylonitrile, acrylamide, butadiene, or styrene; polyurethanes; and polycarbonates. The materials pigmented with the phthalocyanine pigments of the present invention can have any desired shape or form.

The pigments prepared according to this invention are highly water-resistant, oil-resistant, acid-resistant, lime-resistant, alkali-resistant, solvent-resistant, fast to over-lacquering, fast to over-spraying, fast to sublimation, heat-resistant, and resistant to vulcanizing, yet give a very good tinctorial yield and are readily dispersible (for example, in plastic materials).

The following examples further illustrate details for the preparation and use of the pigments of this invention. The invention which is set forth in the foregoing disclosure is not to be limited either in spirit or scope by these examples. Those skilled in the art will readily understand that known variations of the conditions and processes of the following preparation procedures can be used to prepare these pigments. Unless otherwise noted, all temperatures are degrees Celsius and all parts and percentages are by weight.

EXAMPLES

Examples 1–8 Preparation of the pigments

The preparation of pigments according to the invention is described in Examples 1–7 and the preparation of a comparison pigment is described in Example 8.

Pigment dispersibilities were determined by dispersing the pigments in polyvinyl chloride ("PVC") using the procedure described below in Example 10. Pigments prepared according to the examples were compared with a commercially available phthalocyanine pigment. Dispersibility in PVC was evaluated by comparing hot-milled and cold-milled color development according to the following procedure. For each sample tested, a 50 g portion of flexible PVC was added to a hot (155° C.) two-roll mill having a nip thickness of 25 mils (ca. 0.6 mm) and fluxed until uniform. A 0.050 g portion of the test pigment or comparison pigment was sprinkled into the nip over a period of about ten seconds, after which the fluxed material was cut and rolled on the mill for five minutes. The pigmented sheet was then removed from the mill and placed on a clean flat surface to cool. A piece cut from the resultant sheet and allowed to cool to room temperature was used as the "hot-milled" sample for evaluation. A sample cut from the same sheet while still warm was placed on a cold (24° C.) two-roll mill having a nip thickness of 21 mils (ca. 0.5 mm), then folded and passed through the mill seven times. The coldrolled sheet was again fluxed in the hot mill until smooth. A sample cut from the resultant sheet was used as the "cold-milled" sample for evaluation. Color development was evaluated using a scale of 1 to 5 based on the difference between hot-milled and cold-milled color development, where 1 represents poor dispersibility (as evidenced by extreme differences in color development) and 5 represents excellent dispersibility (as evidenced by essentially no difference in color development).

Pigments prepared according to the examples were analyzed by X-ray diffraction using a Siemens D-5000 Spectrometer. Data were collected under the following conditions:

| | |
|---|---|
| Power | 50 kV at 40 mA |
| Slits | 1.0 mm divergence |
| | 1.0 mm antiscatter |
| | 0.1 mm detector |
| Step size | 0.01° |
| Step time | 3 seconds |

For a discussion on X-ray determinations of alpha and beta polymorphic forms, see F.H. Moser and A.L. Thomas, "Polymorphism" in *Phthalocyanine Compounds* (New York: Reinhold Publishing Corporation, (1963)), pages 23-38.

Test results for the pigments of Examples 1-8 are summarized in the Table.

Example 1

A crude unchlorinated copper phthalocyanine (125 g) obtained from Toyo Ink Inc. (Japan) as "Phthalo Blue Crude CPC No. 4 Grade" was introduced into a ball mill containing 3000 g of steel balls as grinding elements. The capacity of the ball mill was such that it was about 60% full when completely charged. The mill was rotated for 48 hours, after which the resultant powder was discharged through a screen that retained the grinding elements. The ball-milled powder was added to water (four times the weight of the pigment) and stirred until thoroughly dispersed. The wetted powder was then treated with dimethyl succinate (60% by weight of the pigment powder), then heated to 85° C. and kept at that temperature for eight hours. The treated pigment was cooled and the dimethyl succinate was hydrolyzed using 50% aqueous sodium hydroxide at 85° C. for two hours. The resultant mixture was cooled, filtered, washed with water, and dried to give a greenish-blue beta-phase copper phthalocyanine. The pigment was very clean, strong, and dispersible in plastics.

Example 2

The process of Example 1 was repeated, except that the chlorine-free phthalocyanine was replaced with a mixture of 30% by weight monochlorinated copper phthalocyanine (obtained from Sanyo Color Works) and 70% by weight chlorine-free copper phthalocyanine (obtained from Toyo Ink Inc.).

Example 3

The process of Example 1 was repeated, except that the chlorine-free phthalocyanine was replaced with a crude cobalt phthalocyanine (obtained from Bayer AG, Germany). A very strong and very soft turquoise cobalt phthalocyanine was obtained.

Example 4

The process of Example 1 was repeated, except that the dimethyl succinate was replaced with dimethyl adipate.

Example 5

The process of Example 1 was repeated, except that the dimethyl succinate was replaced with dimethyl maleate.

Example 6

The process of Example 1 was repeated, except that the dimethyl succinate was replaced with diethyl succinate.

Example 7

The process of Example 1 was repeated, except that the dimethyl succinate was replaced with dimethyl malonate.

Example 8 (comparison)

The process of Example 1 was repeated, except that the dimethyl succinate was replaced entirely with water (that is, no ester was used). The resultant pigment exhibited poor dispersibility and an unacceptable shade that was a mixture of reddish-blue and greenish-blue.

TABLE

| Example | Solvent | Yield (%) | Hue | Dispersibility | Crystal form |
|---|---|---|---|---|---|
| 1 | Dimethyl succinate | 99% | greenish-blue | 4 | beta-phase |
| 2 | Dimethyl succinate | 99% | greenish-blue | 3-4 | beta-phase |
| 3 | Dimethyl succinate | 99% | turquoise | 4 | beta-phase |
| 4 | Dimethyl adipate | 99% | greenish-blue | 3-4 | beta-phase |
| 5 | Dimethyl maleate | 99% | greenish-blue | 3-4 | beta-phase |
| 6 | Diethyl succinate | 99% | greenish-blue | 4 | beta-phase |
| 7 | Dimethyl malonate | 99% | greenish-blue | 4 | beta-phase |
| 8 | Water | — | reddish-blue/greenish-blue | 1 | alpha/beta mixture |

Examples 9-12 Applications

The pigment of Example 1 was used to prepare the pigmented materials described in Examples 9-12.

Example 9 Preparation of enamel paints

A finely divided 8 g sample of the pigment of Example 1 was dispersed in 92 g of a stoving enamel having the following composition:

33% alkyl resin (AROPLAZ ®1453-X-50 alkyd resin, Reichhold Chemicals, Inc., White Plains, N.Y.)
15% melamine resin (e.g., RESIMENT ®BM-7507 melamine resin, Monsanto Company, St. Louis, Mo.)
5% glycol monomethyl ester
34% xylene
13% butanol Upon completion of the dispersion the pigmented paint was applied to metal foils and then baked at 130° C. for 30 minutes. The greenish-blue coatings were fast to light and weathering and had good over-lacquering fastness.

Other suitable alkyd resins are products based on synthetic or vegetable fatty acids, such as coconut oil, castor oil, recinene oil, linseed oil, or the like. Urea resins can be used instead of melamine resins.

Example 10 Preparation of a thermoplastic film

A 0.2 g sample of the pigment of Example 1 was dispersed in 65 g of stabilized polyvinyl chloride and 35 g of diisooctyl phthalate at 160° C. in a mixing mill. A greenish-blue film having very good fastness to light and migration was obtained.

Synthetic polyamides of caprolactam or of adipic acid and hexamethylenediamine or the polyester condensates of terephthalic acid and ethylene glycol can be colored in a similar manner at 280°-300° C. (in an atmosphere of nitrogen where necessary).

Example 11 Preparation of a printing ink

A printing ink was prepared by grinding 35 g of the pigment of Example 1, 65 g of linseed oil, and 1 g of a siccative (cobalt naphthenate, 50% strength in white spirit). When used for offset printing on paper, the ink gave greenish-blue offset prints exhibiting high brilliance and tinctorial strength and very good light and lacquering fastness properties.

Example 12 Preparation of a metallic paint

A mixture of 6 g of the pigment of Example 1 in 12 g of xylene, 4.1 g of butyl acetate, 0.7 g of butanol, and 22.5 g of a 20% solution of cellulose acetobutyrate in 2:1 butyl acetate/xylene was dispersed by agitating for 30 minutes in a shaker containing 2 to 3 mm diameter glass beads. To this dispersion was then added 10 g of a saturated polyester resin (available as DYNAPOL®H 700 from Huls America), 7.3 g of melamine resin, 8.7 g of a 20% solution of cellulose acetobutyrate in 2:1 butyl acetate/xylene, 18 g of butyl acetate, 1.6 g of butanol, and 9.7 g of xylene and shaking was continued for another 5 minutes.

Metallic paints were then prepared by adding a dispersion of aluminum paste (60% solids; available as SPARKLE SILVERO® AR from Silberline Manufacturing Co., Inc.) in xylene (about 1:2) in amounts such that the ratio of pigment to aluminum was between about 80:12 and 1:99.

These metallic paints were applied to panels and after drying were coated with a clearcoat based on an acrylate/melamine resin (which can contain additional additives, such as ultraviolet absorbers). The resulting brilliant metallic greenish-blue paint exhibited good light and weather fastness.

What is claimed is:

1. A process for preparing a beta-phase metal phthalocyanine pigment comprising
(a) dry milling a crude metal phthalocyanine having an average particle size of 10 to 200 μm until the average particle size is reduced to 0.01 to 0.5 μm;
(b) finishing the milled metal phthalocyanine by thoroughly mixing said metal phthalocyanine with at least 4 parts by weight, relative to the metal phthalocyanine, of a finishing solvent comprising a mixture of
(i) 5 to 100 percent by weight, based on the total amount of finishing solvent, of an ester selected from the group consisting of
(1) a monocarboxylic acid monoester having the formula

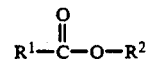

wherein
$R^1$ is $C_1-C_{23}$ alkyl, $C_2-C_{23}$ alkenyl, $C_4-C_8$ cycloalkyl optionally substituted with $C_1-C_8$ alkyl or $C_2-C_8$ alkenyl, $C_4-C_8$ cycloalkenyl optionally substituted with $C_1-C_8$ alkyl or $C_2-C_8$ alkenyl, or a group represented by $R^1-R^b$-wherein $R^a$ is $C_4-C_8$ cycloalkyl optionally substituted with $C_1-C_8$ alkyl or $C_2-C_8$ alkenyl or $C_4-C_8$ cycloalkenyl optionally substituted with $C_1-C_8$ alkyl or $C_2-C_8$ alkenyl and $R^b$ is $C_1-C_8$ alkylene or $C_2-C_8$ alkenylene, and
$R^2$ is $C_3-C_8$ alkyl
(2) a dicarboxylic acid diester having the formula

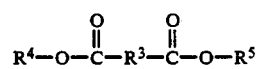

wherein
$R^3$ is a direct single bond, $C_1-C_{22}$ alkylene, $C_2-C_{22}$ alkenylene, $C_4-C_8$ cycloalkylene optionally substituted with $C_1-C_8$ alkyl or $C_2-C_8$ alkenyl, $C_4-C_8$ cycloalkenylene optionally substituted with $C_1-C_8$ alkyl or $C_2-C_8$ alkenyl, or a group represented by $-R^c-R^d-R^e$-wherein $R^c$ and $R^3$ are independently $C_1-C_8$ alkylene or $C_2-C_8$ alkenylene and $R^d$ is $C_4-C_8$ cycloalkylene optionally substituted with $C_1-C_8$ alkyl or $C_2-C_8$ alkenyl or $C_4-C_8$ cycloalkenylene optionally substituted with $C_1-C_8$ alkyl or $C_2-C_8$ alkenyl, and
$R^4$ and $R^5$ are independently $C_1-C_8$ alkyl;
(3) a diol diester having the formula

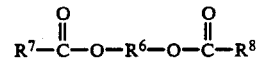

wherein
$R^6$ is $C_2-C_{22}$ alkylene, $C_2-C_{22}$ alkenylene, $C_4-C_8$ cycloalkylene optionally substituted with $C_1-C_8$ alkyl or $C_2-C_8$ alkenyl, $C_4-C_8$ cycloalkenylene optionally substituted with $C_1-C_8$ alkyl or $C_2-c_8$ alkenyl, or a group represented by $-R^f-R^g-R^h$-wherein $R^f$ and $R^h$ are independently $C_1-C_8$ alkylene or $C_2-C_8$ alkenylene and $R^g$ is $C_4-C_8$ cycloalkylene optionally substituted with $C_1-C_8$ alkyl or $C_2-C_8$ alkenyl or $C_4-C_8$ cycloalkenylene optionally substituted with $C_1-C_8$ alkyl or $C_2-C_8$ alkenyl, and
$R^7$ and $R^8$ are independently $C_1-C_8$ alkyl;
(4) a lactone or cyclic carbonate having the formula

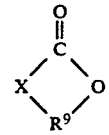

wherein $R^9$ is $C_2$–$C_6$ alkylene optionally substituted with $C_1$–$C_8$ alkyl or $C_2$–$C_8$ alkenyl or $C_2$–$C_6$ alkenylene optionally substituted with $C_1$–$C_8$ alkyl or $C_2$–$C_8$ alkenyl, and X is 0 or a direct single bond; and (5) mixtures thereof; and (ii) 0 to 95 percent by weight, based on the total amount of finishing solvent, of water;

(c) hydrolyzing the ester used in step (b); and (d) collecting the beta-phase metal phthalocyanine pigment.

2. A process according to claim 1 for preparing a beta-phase copper phthalocyanine pigment.

3. A process according to claim 1 for preparing a beta-phase cobalt phthalocyanine pigment.

4. A process according to claim 1 wherein the crude metal phthalocyanine is dry milled at a temperature of between 10° C. and 80° C.

5. A process according to claim 1 wherein the crude metal phthalocyanine is dry milled at a temperature of between 40° C. and 50° C.

6. A process according to claim 1 wherein 4 to 5 parts by weight, relative to the metal phthalocyanine, of a finishing solvent are used in step (b).

7. A process according to claim 1 wherein the finishing solvent comprises 5 to 40 percent by weight of said ester and 60 to 95 percent by weight of water.

8. A process according to claim 1 wherein the finishing solvent used in step (b) is (1) a monocarboxylic acid monoester having the formula

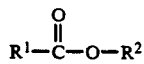

wherein $R^1$ is $C_1$–$C_{23}$ alkyl and $R^2$ is $C_3$–$C_8$ alkyl; or (2) a dicarboxylic acid diester having the formula

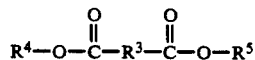

wherein $R^3$ is a direct single bond, $C_1$–$C_{22}$ alkylene, or $C_2$–$C_{22}$ alkenylene and $R^4$ and $R^5$ are independently $C_1$–$C_8$ alkyl.

9. A process according to claim 1 wherein the finishing solvent used in step (b) is a dicarboxylic acid diester having the formula

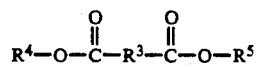

wherein $R^3$ is a direct single bond, $C_1$–$C_8$ alkylene, or $C_2$–$C_8$ alkenylene and $R^4$ and $R^5$ are independently $C_1$–$C_8$ alkyl.

10. A process according to claim 1 wherein the finishing solvent used in step (b) is dimethyl succinate, diethyl succinate, dimethyl adipate, dimethyl maleate, or dimethyl malonate.

11. A process according to claim 1 wherein the finishing solvent used in step (b) is a mixture of (i) 5 to 40 percent by weight of dimethyl succinate, diethyl succinate, dimethyl adipate, dimethyl maleate, or dimethyl malonate and (ii) 60 to 95 percent by weight of water.

12. A process according to claim 1 wherein the milled metal phthalocyanine is finished at a temperature of between 30° C. and 145° C.

13. A process according to claim 1 wherein the milled metal phthalocyanine is finished at a temperature of between 70° C. and 90° C.

14. A process according to claim 1 wherein a strongly alkaline solution is used to hydrolyze the alkyl ester.

15. A process according to claim 1 wherein the beta-phase metal phthalocyanine pigment is collected by filtration.

16. A process according to claim 1 for preparing a beta-phase copper phthalocyanine pigment comprising (a) dry milling a crude copper or cobalt phthalocyanine having an average particle size of 10 to 200 μm at a temperature of between 40° C. and 50° C. until the average particle size is reduced to 0.01 to 0.5 μm;

(b) finishing the milled copper or cobalt phthalocyanine by thoroughly mixing said copper or cobalt phthalocyanine at a temperature of between 70° C. and 90° C. with 4 to 5 parts by weight, relative to the copper or cobalt phthalocyanine, of a mixture of (i) 5 to 40 percent by weight of dimethyl succinate, diethyl succinate, dimethyl adipate, dimethyl maleate, or dimethyl malonate and (ii) 60 to 95 percent by weight of water;

(c) hydrolyzing the alkyl ester used in step (b) with a strongly alkaline solution; and (d) collecting the beta-phase copper phthalocyanine pigment by filtration.

* * * * *